(12) United States Patent
Fukumine et al.

(10) Patent No.: US 8,940,442 B2
(45) Date of Patent: Jan. 27, 2015

(54) POROUS FILM AND SECONDARY BATTERY ELECTRODE

(75) Inventors: Mayumi Fukumine, Kawasaki (JP); Yasuhiro Wakizaka, Yokohama (JP)

(73) Assignee: Zeon Corporation, Tokyo (JP)

( * ) Notice: Subject to any disclaimer, the term of this patent is extended or adjusted under 35 U.S.C. 154(b) by 347 days.

(21) Appl. No.: 12/865,299

(22) PCT Filed: Jan. 30, 2009

(86) PCT No.: PCT/JP2009/051589
§ 371 (c)(1),
(2), (4) Date: Oct. 8, 2010

(87) PCT Pub. No.: WO2009/096528
PCT Pub. Date: Aug. 6, 2009

(65) Prior Publication Data
US 2011/0020709 A1     Jan. 27, 2011

(30) Foreign Application Priority Data
Jan. 30, 2008   (JP) .................................. 2008-019004

(51) Int. Cl.
| | |
|---|---|
| *H01M 2/16* | (2006.01) |
| *B32B 3/00* | (2006.01) |
| *B32B 23/00* | (2006.01) |
| *B32B 25/00* | (2006.01) |
| *C09K 11/02* | (2006.01) |
| *C09K 3/00* | (2006.01) |
| *C08J 5/18* | (2006.01) |
| *H01M 4/13* | (2010.01) |

(52) U.S. Cl.
CPC ................ *H01M 2/1653* (2013.01); *C08J 5/18* (2013.01); *H01M 2/162* (2013.01); *H01M 2/1646* (2013.01); *H01M 4/13* (2013.01); *C08J 2301/02* (2013.01); *Y02E 60/122* (2013.01)
USPC . 429/246; 428/165; 252/301.34; 252/182.13; 252/182.24

(58) Field of Classification Search
None
See application file for complete search history.

(56) References Cited

U.S. PATENT DOCUMENTS

| | | | |
|---|---|---|---|
| 5,635,151 | A | 6/1997 | Zhang et al. |
| 5,837,015 | A | 11/1998 | Venugopal et al. |
| 2005/0074669 | A1 | 4/2005 | Park et al. |
| 2005/0266305 | A1 | 12/2005 | Ohata et al. |
| 2006/0216608 | A1 * | 9/2006 | Ohata et al. ................... 429/246 |
| 2008/0038639 | A1 | 2/2008 | Ohata et al. |

FOREIGN PATENT DOCUMENTS

| | | | |
|---|---|---|---|
| CN | 1795578 | A | 6/2006 |
| CN | 1969411 | A | 5/2007 |
| JP | 05-205719 | A | 8/1993 |
| JP | 08-050890 | A | 2/1996 |
| JP | 11-067213 | A | 3/1999 |
| JP | 2000-500612 | A | 1/2000 |
| JP | 2002-33105 | A | 1/2002 |
| JP | WO 2005/011043 | A1 | 2/2005 |
| JP | 2005-108833 | A | 4/2005 |
| JP | 2006-172992 | A | 6/2006 |
| JP | 2006172992 | A * | 6/2006 |
| JP | 2007-012598 | A | 1/2007 |
| WO | WO 2005/117169 | A1 | 12/2005 |

OTHER PUBLICATIONS

International Search Report, dated Apr. 7, 2009, issued in corresponding international application PCT/JP2009/051589.

* cited by examiner

*Primary Examiner* — Ula C. Ruddock
*Assistant Examiner* — Daniel Gatewood
(74) *Attorney, Agent, or Firm* — Birch, Stewart, Kolasch & Birch, LLP

(57) ABSTRACT

The present invention is intended for providing a porous film having excellent film uniformity, and is capable to contribute for improving cyclic and rate properties, which is provided on a surface of electrode used for a secondary battery and the like.

The porous film of the present invention is characterized by including water soluble polymer having an average polymerization degree of 500 to 2500, an inorganic filler and water soluble particulate polymer. In the present invention particularly, it is preferable that said water soluble polymer is thickening polysaccharides, further said water-insoluble polymer is preferably selected from the group consisting of semisynthetic cellulose polymer, sodium salt and ammonium salt thereof.

19 Claims, No Drawings

POROUS FILM AND SECONDARY BATTERY ELECTRODE

TECHNICAL FIELD

The present invention relates to a porous film, more precisely, to a porous film formed on an electrode surface of a lithium ion secondary battery and an electric double layer capacitor which possibly contributes to improve an electrolyte solution absorption property and rate capability of a battery. Also, the present invention relates to a secondary battery electrode provided with said porous film.

BACKGROUND ART

In a practically applied battery, a lithium ion secondary battery has the highest energy density and has been widely used for, in particularly, small sized electronic devices. Also, in addition to a small sized usage, it has been prospected for expanding usage for vehicles. In this matter, it has been desired long term durability and more improvement of safety for a lithium ion secondary battery.

A lithium ion secondary battery normally comprises a positive electrode and a negative electrode including electrode composite material layer supported on a collector, a separator and a nonaqueous electrolyte. The electrode composite material layer comprises an electrode active material having about 5 to 50 µm of an average particle size and a binder. The electrodes are produced by forming an electrode composite material layer by coating composite material slurry including a powdery electrode active material on the collector. Also, as for the separator for separating the positive and negative electrodes, a very thin separator having about 10 to 50 µm thickness is used. The lithium ion secondary battery is produced by stacking the electrodes and the separator, and cutting them to be a predetermined electrode shape and the like. However, during this continuing producing process, the active material sometimes disengages from the electrode composite material layer and a part of the disengaged active material is included in the battery as a contamination.

The contamination like this has 5 to 50 µm of particle diameter which is about same level of the thickness of the separator, and the contamination penetrates the separator in the battery which causes a problem inducing short circuit. Also, heat is generated when the battery operating. As a result, a separator composed of a stretched polyethylene and the like are also heated. The separator composed of the stretched polyethylene and the like tends to shrink even though at a temperature of 150° C. or less in general, which could easily to induce a short circuit of the battery. Also, when a projection having sharp shape like a nail penetrates (for example, nail penetration tests), short circuit reaction heat is generated quickly, and a short circuit portion is enlarged.

Therefore, in order to solve such the problems, it is proposed to provide a porous protection film on a surface of the electrode. By providing the porous protection film, the disengagement of the active material at the time of producing process of the battery is prevented, and the short circuit when operating the battery is also prevented. Further, because the protection film is porous, there is no inhibition of battery reaction by penetrating an electrolysis solution in the protection film.

For example, in Patent Document 1, a porous protection film formed by using fine particle slurry including polyvinylidene fluoride as a binder and a fine particle such as alumina, silica, polyethylene resin and the like is disclosed. In Patent Document 2, a porous protection film composed of thermal crosslinking resin such as polyacrylonitrile as for a binder is disclosed.

However, in case that polymer such as polyvinylidene fluoride and thermal crosslinking resin are used as the binder, a dispersibility of the fine particle is not sufficient in fine particle slurry, so that it has been difficult to produce a uniform porous film, due to sequential precipitation by fine particle aggregation to thereby causes nonuniformity of coating thickness.

Also, in Patent Document 3, a porous protection film produced by using a slurry obtained by dispersing an inorganic filler in a particulate resin binder composed of a copolymer including acrylonitrile unit and (meth)acrylate unit and a water-soluble polymer such as carboxymethyl cellulose and the like. However, the inorganic filler aggregation is occurred in this slurry, also, fluidity of the obtained slurry is very low, therefore it has been difficult to produce a uniform porous film.

Patent Document 1: Japanese Patent Laid Open No. 7-220759
Patent Document 2: Japanese Patent Laid Open No. 2005-332809
Patent Document 3: WO2005/011043

DISCLOSURE OF INVENTION

Problem to be Solved by the Invention

The present invention has been made in view of the above conventional technical arts, a purpose of the invention is to provide a porous film provided on a surface of an electrode used for a secondary battery and the like, which has excellent film uniformity and is capable to contribute for improving a cycle characteristic and a rate characteristic of the battery.

Means for Solving the Problem

In order to solve the above mentioned problem, as a result of intentional study by the present inventors have found that there exists a thick film portion locally when uniformity of a porous film is low, lithium ion conductivity is inhibited at the portion, to deteriorate a rate characteristic thereby. Then, it has been found that fluidity of slurry and dispersibility of inorganic filler are improved by using water soluble polymer having a specific average polymerization degree and particulate polymer as a binder to form a porous film, and as a result a porous film having high uniformity and showing an excellent rate characteristic can be obtained, and the present invention has been achieved thereby.

The present invention to resolve the above problem includes following matters as a gist.

(1) A porous film comprising;
water soluble polymer having an average degree of polymerization of 500 to 2500,
inorganic filler and
water-insoluble polymer.

(2) The porous film as set forth in (1), wherein
said water soluble polymer is selected from thickening polysaccharides.

(3) The porous film as set forth in (2), wherein
said water soluble polymer is selected from the group consisting of cellulose base semisynthetic polymers, sodium salts and ammonium salts thereof.

(4) The porous film as set forth in any one of (1) to (3), wherein
said water soluble polymer is selected from the group consists of cellulose base semisynthetic polymers, sodium salts and ammonium salts thereof, and
a degree of etherification thereof is 0.5 to 1.0.

(5) The porous film as set forth in any one of (1) to (4), wherein
a content ratio of water soluble polymer in said porous film is 0.1 to 5 parts by mass per 100 parts by mass of said inorganic filler, a content ratio of water-insoluble particulate polymer is 0.1 to 15 parts by mass per 100 parts by mass of the inorganic filler.

(6) A secondary battery electrode composed of
an electrode composite layer including a binder and an electrode active material,
a collector to which the electrode composite material layer is adhered, and
the porous film as set forth in (1) is provided on a surface of the electrode composite material layer.

(7) A method for manufacturing secondary battery electrode as set forth in (6) comprising;
coating and drying a slurry for porous film composed of including water soluble polymer having 500 to 2500 average polymerization degree, an inorganic filler, water-insoluble particulate polymer and disperse medium on an electrode composite material layer including a binder and an electrode active material.

(8) A lithium ion secondary battery comprising a positive electrode, a negative electrode and electrolyte solution wherein
at least one of the positive electrode and the negative electrode is the electrode as set forth in (6).

Effects of the Invention

By the present invention, a porous film which is capable to contribute for improving an electrolysis solution absorption property and rate characteristic for a battery is provided. The porous film is formed on a surface of a secondary battery electrode, acts as a protective film of the electrode and contributes to prevent disengagement of an active material when manufacturing a battery, and to prevent a short circuit when battery operating. Also, because the porous film has high porosity, there is no inhibition of battery reaction by penetrating an electrolysis solution in the film.

BEST MODE FOR WORKING THE INVENTION

Hereinafter, the present invention will be explained, precisely.

A porous film of the present invention comprises water soluble polymer, inorganic filler and water-insoluble particulate polymer.

An average polymerization degree of the water soluble polymer used for the present invention which is calculated from intrinsic viscosity measured by Ubbelohde viscometer is within a range of 500 to 2500, preferably 1000 to 2000, further preferably 1000 to 1500.

In the present invention, a reason that the average polymerization degree of the water soluble polymer is important ax explained below.

In aqueous slurry, a part of the water soluble polymer exists in water and it is supposed that disperse stabilization of the inorganic filler is performed by adsorbing a part of the polymer adsorbed on a surface of the inorganic filler. Then, the average polymerization degree of the water soluble polymer largely effects to adsorption stability to the inorganic filler.

Thus, in case that the average polymerization degree of the water soluble polymer is smaller than said range, solubility of the water soluble polymer to water is high. Also, when the average polymerization degree is small, mobility of the polymer becomes high. Therefore, even in case that the water soluble polymer adheres to the surface of the inorganic filler, it could easily to remove from the inorganic filler due to mobility and high solubility of the polymer, dispersion stable layer by the water soluble polymer on the surface of the inorganic filler becomes sparse, as a result, the inorganic filler cannot be dispersed stably. Also, the viscosity of the water soluble polymer largely effects to the viscosity of the obtained slurry. When the water soluble polymer having small average polymerization degree is used, the viscosity of the slurry decreases considerably, and precipitation of the inorganic filler in slurry with time passage tends to occur. Therefore, it is necessary to perform coating process immediately after manufacturing slurry, and there becomes lots of process restrictions which causes poor practicability. Additionally, because the coating process is performed by using slurry which tends to precipitation easily, a uniform coating film thickness cannot be obtained since the slurry precipitates gradually during the coating process.

To the contrary, in case that the average polymerization degree of the water soluble polymer is larger than above range, a phenomenon which is totally different from the above occurs. In the water soluble polymer, a lot of adsorption site to the inorganic filler are existing. Although it is possible to make adsorption stabilizing efficiently by existing a lot of adsorption sites in the water solvent polymer, when the average polymerization degree is too large, it tends to occur adsorption between a plurality of inorganic fillers. As a result, aggregation of the inorganic filler is induced undesirably by the water soluble polymer which should make dispersion stabilizing. In addition, as mentioned above, because the average polymerization degree of the water soluble polymer largely effects to the viscosity of the slurry, when the water soluble polymer having large average polymerization degree is used, the viscosity of the slurry is considerably increased, and the fluidity of the slurry is lowered. As a result, smoothing (leveling) of the surface of the coating film is hardly occurred in coating process, and the obtained electrode becomes non-uniform. Also, although it is necessary to pass through a filter when performing contamination removing in the slurry in mass production, if the slurry having high viscosity is used, it is industrially disadvantage, because a flow speed at a contamination removing filter cannot be faster.

In this manner, in the present invention, the average polymerization degree of the water soluble polymer provides large effect to fluidity of the slurry, a film uniformity of the obtained porous film and process of steps, it is very important to select water soluble polymer having optimal average polymerization degree.

Note that, the water soluble polymer in this specification means polymer that has insoluble matter of 0.5 mass % or less when 0.5 g polymer is dissolved in 100 g of water at 25° C. On the other hand, water-insoluble polymer means polymer that has insoluble matter of 90 mass % or more under the same condition.

As for the natural polymer, for example, natural polymer, semisynthetic polymer and synthetic polymer can be exemplified.

As for the natural polymer, for example, polysaccharides and proteins derived from plant or animal origin and the like can be exemplified, also, natural polymer treated by fermentation by micro organism and the like and heat can be exemplified, according to the circumstances. These natural polymers can be classified as plant base natural polymer, animal base natural polymer and micro organic base natural polymer.

As for the plant base natural polymer, for example, gum arabic, gum tragacanth, galactan, Guar gum, carob gum, carageenan, pectin, kannan, quince seed (marmelo), algecolloid (phaeophyceae extract), starch (originated from rice, corn, potato, wheat and the like), glycyrrhizin and the like can be exemplified. As for the animal base natural polymer, for example, collagen, casein, albumin, gelatin and the like can be exemplified. As for the micro organism base natural polymer, xanthan gum, dextran, succinoglucan, pullulan and the like are exemplified.

Semisynthetic polymer means the modified products of the above mentioned natural polymer such as polysaccharides and protein and the like derived from plant or animal by chemical reaction. For example, as for the semisynthetic polymer starch base semisynthetic polymer, cellulose base semisynthetic polymer, alginic acid base semisynthetic polymer and micro organism base semisynthetic polymer are exemplified.

As for the starch base semisynthetic polymer, solubilized starch, carboxymethyl starch, methylhydroxypropyl starch, modified potato starch are exemplified.

Cellulose base semisynthetic polymer can be classified as nonionic, anionic and cationic.

As for the nonionic cellulose base semisynthetic polymer, for example, alkylcellulose such as methylcellulose, methylethylcellulose, ethylcellulose, microcrystalline cellulose or the like, and hydroxyalkylcellulose such as hydroxyethylcellulose, hydroxybutylmethylcellulose, hydroxypropylcellulose, hydroxypropylmethylcellulose, hydroxyethylmethylcellulose, hydroxypropylmethylcellulose stearoxyether, carboxymethylhydroxyethylcellulose, alkylhydroxyethylcellulose, nonoxynyl hydroxyethyl cellulose or the like can be exemplified.

As for the anionic cellulose base semisynthetic polymer, alkylcellulose ether and their sodium salt and ammonium salt can be exemplified wherein the above mentioned nonionic cellulose base semisynthetic polymer are substituted by various derivative groups. For example, cellulose sodium sulfate, methylcellulose ether, methylethylcellulose ether, ethylcellulose ether, carboxymethylcellulose ether (CMC), salts thereof and the like can be exemplified.

As for the cationic cellulose base semisynthetic polymer, for example, low nitrogen hydroxyethylcellulose dimethyldiallyl ammonium chloride (Polyquaternium-4), O-chloride [2-hydroxy-3-(trimethylammonio)propyl]hydroxyethyl cellulose (Polyquaternium-10), O-chloride[2-hyrdoxy-3-(lauryldimethylammonio)propyl]hydroxyethyl cellulose (Polyquaternium-24) and the like can be exemplified.

As for the alginic acid base semisynthetic polymer, sodium alginate, alginate propylene glycol and the like can be exemplified. As for the chemically modified micro organic base semisynthetic polymer, polymeric compound wherein xanthan gum, dehydroxanthan gum, dextran, succinoglucan, pullulan and the like are chemically modified can be exemplified.

Synthesized polymer is an artificial polymer made by chemical reaction. As for the synthesized polymer, for example, poly(meth)acrylic acid type polymer, poly(meth) acrylate type polymer, polyvinyl type polymer, polyurethane type polymer, polyether type polymer can be exemplified.

As for the poly(meth)acrylic acid type polymer, for example, polyacrylic acid, polymethacrylic acid and their salts can be exemplified.

The polyvinyl type polymer can be classified to nonionic, cationic and amphoteric. As for the nonionic polyvinyl type polymer, for example, polyacrylamide, polyvinyl alcohol, polyvinylmethyl ether, polyvinylformamide, polyvinylacetamide and the like can be exemplified.

As for the cationic polyvinyl type polymer, for example, dimethyldiallyl ammonium/acrylamide (Polyquaternium-7), diethyl sulfate of vinylpyrolidone/N,N-dimethylaminoethyl methacrylic acid copolymer (Polyquaternium-11), methyl sulfate of acrylamide/β-methacryloxyethyltrimethyl ammonium copolymer (Polyquaternium-5), ammonium salt of methylvinylimidazolinium chloride/vinylpyrolidone copolymer (Polyquaternium-16), vinylpyrolidone/dimethylaminopropylmethacrylamide(Poly-quaternium-28), vinylpyrolidone/imidazoliniumammonium(Polyquaternium-44), vinylcaprolactam/vinylpyrolidone/methylvinylimidazolinium methyl sulfate(Polyquaternium-46), N-vinylpyrolidone/N,N-dimethyl amino ethyl methacrylate, N,N-dimethyl amino ethyl methacrylate diethyl sulfate and the like can be exemplified.

As for the amphoteric polyvinyl type polymer, for example, acrylamide/acrylic acid/dimethyldiallylammoniumchloride (Polyquaternium-39), dimethyldiallylammonium chloride/acrylic acid (Polyquaternium-22), dimethyldiallylammoniumchloride/acrylic acid/acrylamide copolymer and the like can be exemplified.

As for the polyurethane type polymer, for example, anionic polyether polyurethane, cationic polyether polyurethane, amphoteric polyether polyurethane, anionic polyester polyurethane, cationic polyester polyurethane, nonionic polyester polyurethane, amphoteric polyester polyurethane and the like can be exemplified.

As for the polyether type polymer, for example, polyethylene glycol, polypropylene glycol, polyethylene glycol/polypropylene glycol and the like can be exemplified.

Stability at high electric potential is necessary when used in a battery internal. Dispersibility of filler is required when used for a porous film. Also, in view of necessity for coating processing on a surface of electrode and a surface of separator, the slurry is required to show fluidity having certain level of viscosity. In this manner, it is necessary to select raw materials from numerous views like this. In these water soluble polymers, particularly, thickening polysaccharides are preferable in view of providing viscosity. As for the thickening polysaccharides, the above exemplified natural polymer and cellulose base semisynthetic polymer are included. In these polymers, in particular, the thickening polysaccharides selected from the group consisting of the cellulose base semisynthetic polymer, sodium salt thereof and ammonium salt thereof are preferable, in view of having cationic, anionic or amphoteric properties. In these, the anionic cellulose base semisynthetic polymer is preferable particularly, in view of dispersibility of filler.

Also, an etherification degree of preferable water soluble polymer selected from the group consisting of cellulose base semisynthetic polymer, sodium salt thereof and ammonium salt thereof is preferably within a range of 0.5 to 1.0, more preferably, within a range of 0.6 to 0.8. The etherification degree means a degree of substitution to carboxymethyl group and the like of hydroxyl group (three) per one anhydroglucose unit in the cellulose. Said etherification degree can be a value from 0 to 3, theoretically. When the etherification degree becomes larger, a ratio of the hydroxyl group is the cellulose is decreased, and hence a ratio of the substituent is increased. When the etherification degree becomes small, the hydroxyl group in the cellulose is increased, and the substituent is decreased.

When the cellulose base semisynthetic polymer is used as the water soluble polymer, an amount of the substituent (carboxymethyl group and the like) and an amount of the hydroxyl group in the cellulose base semisynthetic polymer particularly may influence to adsorptive property to a surface of inorganic filler, and the substituent (carboxymethyl group and the like) may influence solubility to water, because the substitution exists as sodium salt and the like. When the etherification degree is within the above mentioned range, there is advantageous dispersibility, because it is adsorbed to the surface of the inorganic filler with compatible solubility to water can be found, and the filler can be finely dispersed to be primary particle level. By having most appropriate average polymerization degree additionally, temporal passage stability is improved, and it is possible to perform coating process without aggregation to prevent a nonuniformity thickness. When the etherification degree is too low, solubility to water is deficient because the substituent (carboxyl methyl group and the like) in the cellulose is few, thus the compatible solubility to water is deteriorated. Therefore, the cellulose base semisynthetic polymer adsorbed to the surface of filler does not show the compatible solubility to water, it works as aggregation agent contrary. On the other hand, when the etherification degree is too high, the solubility to water is increased because the substituent (carboxymethyl group and the like) in the cellulose is increased. Also, the cellulose base semisynthetic polymer exists in water rather than adsorbed to the filler, as a result, aggregation is occurred due to the aggregation of the fillers cannot be prevented, as similar with the above. This phenomenon causes the aggregation progresses further due to deterioration of dispersion stability, because adsorption and desorption could easily be occurred with increasing particle mobility, when the average polymerization degree is small.

It is desired that inorganic filler is stable electro-chemically under using environment of a secondary battery. Also, it is desired that the inorganic filler is a material which is suitable to prepare the slurry mixed with said water soluble polymer and particulate polymer.

It is desirable that BET specific surface area of the filler is, for example, 0.9 $m^2/g$ or more, further, 1.5 $m^2/g$ or more. Also, in view of inhibiting aggregation of the filler and optimizing the fluidity of the slurry, it is desirable that BET specific surface area is not too large, for example, 150 $m^2/g$ or less. Also, an average particle diameter of the inorganic filler (D50 average particle diameter of volume average), is 0.1 to 5 µm, further, 0.2 to 2 µm is preferable.

From the above view, as for the inorganic filler, inorganic oxide is preferably used, for example, alumina (aluminum oxide), magnesia (magnesium oxide), calcium oxide, titania (titanium oxide), zirconia (zirconium oxide), talc, silica stone and the like are used as materials.

The inorganic fillers like these have advantage dispersion stability and homogenous slurry condition is maintained during long time without precipitation when slurry for porous film is prepared.

The particulate polymer consists of water-insoluble polymer. Here, a definition of "water-insoluble" is as mentioned above. The weight average molecular weight based on polystyrene standard by GPC of the particulate polymer is preferably within a range of 10000 to 500000, more preferably 20000 to 200000. When the weight average molecular weight of the particulate polymer is within the above mentioned range, a porous film having advantage strength in which inorganic filler is uniformly dispersed can be obtained.

Also, an average particle diameter of the particulate polymer (D50 average particle diameter of volume average) is preferably 0.01 to 0.5 µm, further, 0.01 to 0.2 µm is more preferred. When the particle diameter of the particulate polymer is too large, adhesion property may reduced because contact points with the filler are reduced. When the particle diameter is too small, there is a risk to deteriorate a battery characteristics due to raising a film resistance, because whole porous film may be coated easily.

Further, a glass transition temperature (Tg) of the particulate polymer is preferably 20° C. or below, further 5° C. or below is preferred. When the glass transition temperature (Tg) of the particulate polymer is within this range, a flex resistance of the electrode is improved, because a flexibility of the porous film is improved.

As for specific examples of the particulate polymer like the above mentioned, it can be exemplified particles made from flexible polymer as mentioned below.

(a) Acrylic Type Soft Polymers

Homopolymer of acrylic acid or methacrylic acid derivatives or copolymer with monomer copolymerizable therewith, such as butylacrylate/styrene copolymer, butylacrylate/acrylonitrile copolymer, butylacrylate/acrylonitrile/glycidylmethacrylate copolymer, ethylacrylate/acrylonitrile/methacrylic acid/glycidylmethacrylate copolymer.

(b) Isobutylene Type Soft Polymers

Homopolymer of isobutylene or copolymer with monomer copolymerizable therewith, such as polyisobutylene, isobutylene/isoprene rubber, isobutylene/styrene copolymer.

(c) Diene Type Soft Polymers

Homopolymer of diene compound or copolymer with monomer copolymerizable therewith, such as polybutadiene, polyisoprene, butadiene/styrene random copolymer, isoprene/styrene random copolymer, acrylonitrile/butadiene copolymer, acrylonitrile/butadiene/styrene copolymer, butadiene/styrene block copolymer, styrene/butadiene/styrene/ block copolymer, isoprene/styrene block copolymer, styrene/isoprene/styrene block copolymer and the like.

(d) Silicon Containing Soft Polymers dimethyl polysiloxane, diphenyl polysiloxane, dihydroxy polysiloxane (e) Olefinic Soft Polymers Homopolymer of olefinic compound or copolymer with monomer copolymerizable therewith, such as polyethylene, polypropylene, poly-1-butene, ethylene/α-olefin copolymer, propylene/α-olefin copolymer, ethylene/propylene/diene copolymer (EPDM), ethylene/propylene/styrene copolymer and the like.

(f) Soft Polymer Composed of Unsaturated Alcohol and Amine or Acyl Derivative Thereof or Acetal Unsaturated alcohol and amine or acyl derivative thereof or acetal such as polyvinyl alcohol, polyvinyl acetate, polyvinyl stearate, vinyl acetate/styrene copolymer and the like.

(g) Epoxy Type Soft Polymers

Homopolymer of epoxy compound or copolymer with monomer copolymerizable therewith, such as polyethylene oxide, polypropylene oxide, epichlorohydrin rubber and the like.

(h) Fluorine Containing Soft Polymers

Vinylidene fluoride rubber, polytetra-fluoroethylene-propylene rubber.

(i) Other Soft Polymers

Natural rubber, polypeptide, protein, polyester type thermoplastic elastomer, vinyl chloride type thermoplastic elastomer, polyamide type thermoplastic elastomer.

In the above mentioned soft polymers, at least one kind of soft polymer selected from the group consisting of (a) acrylic type soft polymer, (b) isobutylene type soft polymer and (c) diene type soft polymer is preferable, because having advantage a holding property of the inorganic filler in obtainable porous film and flexibility. Particularly, in view of easily obtaining battery having oxidoreduction stability and advantage durability, (a) acrylic type soft polymer is preferable.

Also, it is preferable that the particulate polymer contains crosslinking group. In case that the crosslinking group is introduce, the porous film can be crosslinked by heat treatment after forming the porous film, and hence a strong and flexible porous film can be obtained, because dissolving and swelling to electrolyte solution can be prevented. As for the crosslinking group, epoxy group, hydroxyl group, N-methylol amide group, oxazoline group and the like are exemplified and epoxy group and/or hydroxyl group are preferable. The crosslinking group may be introduced at the time of producing the particulate polymer by copolymerizing polymerizable compound including the crosslinking group simultaneously, also, it may be introduced to the particulate polymer by commonly used modifying means using crosslinking group containing compound.

A method for producing the particulate polymer is not particularly limited, any methods such as solution polymerization method, suspension polymerization method, emulsion polymerization method can be used. As for a polymerization initiator used for polymerization, for example, organic peroxide such as lauroyl peroxide, diisopropyl peroxydicarbonate, di-2-ethylhexyl peroxydicarbonate, t-butyl peroxypivalate, 3,3,5-trimethylhexanoil peroxide and the like, azo compound such as $\alpha,\alpha'$-azobisisobutylnitrile and the like, or ammonium persulfate, potassium persulfate and the like can be exemplified.

The porous film of the present invention is obtained by coating a slurry (slurry for porous film) composed of the above mentioned water soluble polymer, particulate polymer, inorganic filler and dispersion medium on a predetermined substrate material and drying. Although the substrate material is not particularly limited, the porous film of the present invention is preferably formed on surfaces of a secondary battery electrode and electric double layer electrode particularly.

Solid component of in the obtainable porous film is equal to solid component of slurry for porous film, it contains preferably 0.1 to 5 parts by mass of water soluble polymer, further preferably 0.2 to 4 parts by mass, also contains preferably 0.1 to 15 parts by mass of particulate polymer, further preferably 0.5 to 10 parts by mass per 100 parts by mass of said inorganic filler. When content amounts of the water soluble polymer and the particulate polymer are less than said range, there is a risk for reducing aggregation or porosity, because dispersion property of the inorganic filler is reduced. Further, adhesive properties of the inorganic filler each other and to the electrode are reduced, there is a risk for dropping powder and reducing flexibility. When content amounts of the above mentioned water soluble polymer and the particulate polymer are larger than said range, there is a risk for increasing resistance, because movement of Li is inhibited by covering voids.

Also, in the porous film, dispersion agent and electrolyte solution additive agent and the like preventing degradation of battery electrolyte may be included in addition to the above mentioned water soluble polymer, particulate polymer and inorganic filler. These are not particularly limited if it does not influence to battery reaction.

Because the porous film of the present invention has appropriate porosity and absorbs electrolyte solution and the electrolyte solution penetrates into the film, therefore battery reaction cannot be inhibited, if in case that the film is formed on the surface of the secondary battery electrode, and there is no adversely affect to a rate characteristic and the like as compared with a conventional porosity protection film. Also, because the porous film of the present invention has appropriate flexibility, it performs as a protective film of the electrode as formed on the surface of secondary battery electrode, and it contributes to prevent disengagement of active material during manufacturing process of the battery and to prevent short circuit when the battery is operated.

The porous film like this has excellent balance of porosity and flexibility, also high holding property of filler, thus, disengagement of the filler during manufacturing process of the battery can be reduced.

A thickness of the porous film is not particularly limited, although it can be set as appropriately in accordance with usage of the film or applying fields, when it is too thin, a uniform film cannot be formed, also when it is too thick, a capacity per volume (weight) in the battery is decreased, therefore 1 to 50 μm is preferred. Further, when it is formed as a protective film on the electrode surface, 1 to 20 μm is preferred.

The porous film of the present invention is formed by coating the slurry for porous film comprising the above mentioned predetermined solid composition on a substrate material such as a secondary battery electrode and the like and drying. Also, the porous film can be formed by drying after immersing the substrate material to said slurry. Alternatively, a porous film, which is obtained by coating the slurry on a release film may be transferred on a predetermined substrate base material.

Although solid content concentration of the slurry for porous film is not particularly limited unless having viscosity and fluidity capable to perform the above coating and immersion, in normally, 20 to 50% by weight and the like. Also, as for a dispersion medium of the slurry for porous film, although it is not particularly limited if the above mentioned solid contents can be dispersed uniformly, in normally, water, acetone, tetrahydrofuran, methylene chloride, chloroform, dimethyl formamide, N-methyl pyrolidone, cyclohexane, xylene, cyclohexanone or mixed solvent thereof are used. Among them, it is preferable to use water particularly. The water soluble polymer dissolves by using water, the slurry wherein particulate polymer and inorganic filler are dispersed uniformly in the solution can be obtained. Also, it is preferable to use water in view of working condition and environment conservation, because organic solvent is not used.

A method for producing slurry for porous film is not particularly limited, it is obtained by mixing the above mentioned water soluble polymer, particulate polymer and inorganic filler as well as other component to be added in accordance with, and dispersion medium. By using above components, the slurry for porous film in which inorganic filler is highly dispersed can be obtained regardless of mixing method and mixing order. As a mixing apparatus, it is not particularly limited if the above mentioned components can be mixed uniformly, although a ball mill, a sand mill, a pigment dispersing machine, a grinder, an ultrasonic dispersion machine, a homogenizer, a planetary mixer can be used, in particular, it is preferable to use a high dispersion machine such as a bead mill, a roll mill, Fill mix and the like which is capable to provide high dispersion share.

The porous film of the present invention is formed on a surface of a secondary battery electrode, and is preferably used as a protective film for an electrode composite material layer or as a separator. The secondary battery electrode, to which the porous film is formed, is not particularly limited, the porous film of the invention can be formed on electrodes having various kind of configuration. Also, the porous film may be formed on any surfaces of positive electrode and negative electrode of the secondary battery, also it can be formed on both positive and negative electrodes. Further, the porous film is used as a protective film or an electric double layer capacitor too.

The secondary battery electrode and the electrode of electric double layer capacitor are generally composed of electrode composite material layer formed by slurry comprising a binder and an electrode active material (hereinafter sometimes referred as "composite material slurry") is adhered to a collector.

For the electrode active material, any compounds can be used if it is available to charge and discharge lithium ion reversibly by applying electric potential in electrolyte, and inorganic and organic compounds may be used.

An active material for positive electrode (positive electrode active material) is classified into two broad categories, namely inorganic compound and organic compound. As for the inorganic positive electrode active material, transition metal oxide, complex oxide of lithium and transition metal, transition metal sulphide and the like are exemplified. As for the above mentioned transition metal, Fe, Co, Mn and the like are used. As specific examples of the inorganic compound used for the positive electrode active material, lithium containing complex metal oxide such as $LiCoO_2$, $LiNiO_2$, $LiMnO_2$, $LiMn_2O_4$, $LiFePO_4$, $LiFeVO_4$ and the like, transition metal sulphide such as $TiS_2$, $TiS_3$, amorphous $MoS_2$ and the like, transition metal oxide such as $Cu_2V_2O_3$, amorphous $V_2O$—$P_2O_5$, $MoO_3$, $V_2O_5$, $V_6O_{13}$ and the like are exemplified. These compounds may be made elemental substitution partially. As for the positive electrode active material composed of the organic compound, for example, such conductive polymer as polyacetylene, poly-p-phenylene and the like can be used. Ferrous oxide which has poor electric conductivity, but it may be used as an electrode active material covered with a carbon material by existing a carbon source when reduction firing. Also, these compounds may be partially elemental substituted.

The positive electrode active material may be a mixture of the above mentioned inorganic compounds and organic compounds. Although a particle diameter of the positive electrode active material is suitably selected in view of balance with other constitutional element of the battery, 50% accumulated volume diameter is normally 0.1 to 50 µm, preferably 1 to 20 µm, in view of improving battery property, such as a load characteristic and cycling characteristic. When the 50% accumulated volume diameter is within this range, a secondary battery having large discharge and charge amount, and it is easy for handling when producing the slurry for electrode and coating the slurry to form electrode. The 50% accumulated volume diameter can be determined by measuring particle size distribution with laser diffraction.

As for an electrode active material for a negative electrode (negative electrode active material), carbonaceous materials such as, amorphous carbon, graphite, natural graphite, meso carbon micro beads, pitch base carbon fiber and the like, conductive polymer such as polyacene and the like can be exemplified. Also, as for the negative electrode active material, metals such as silicon, tin, zinc, manganese, iron, nickel, and alloys, oxides, sulfates thereof are used. Additionally, metallic lithium, lithium alloy such as Li—Al, Li—Bi—Cd, Li—Sn—Cd and the like, lithium transitional metal nitrides can be used. An electrode active material on which conductivity improver is adhered by a mechanical modifying method can be used too. Although a particle diameter of the negative electrode active material is suitably selected in view of balance with other constitutional element of the battery, 50% accumulated volume diameter is normally 1 to 50 µm, preferably 15 to 30 µm, in view of improving battery characteristics, such as initial efficiency, a load characteristic and cycling characteristic.

The conductivity improver may be added to composite material slurry, in addition, to be adhered to said electrode active material. As for the conductivity improver, conductive carbon such as, acetylene black, ketchen black, carbon black, graphite, vapor phase growth carbon fiber, carbon nanotube and the like can be used. Carbon powder such as graphite, fiber and foil of various metals are also exemplified. As for reinforcement material, various organic and inorganic spherical type, plate type, rod type and fiber type filler can be used. By using the conductivity improver, electric contact of each electrode active materials can be improved which contribute to improve discharge rate characteristic when used to a lithium ion secondary battery, to reduce an internal resistance when using an electric double layer capacitor, and volume density can be increased. Using amount of the conductivity improver is normally 0 to 20 parts by mass, preferably 1 to 10 parts by mass per 100 parts by mass of the electrode active material.

The electrode composite material layer includes the above mentioned binder and electrode active agent. In normally, the composite material is prepared as composite slurry dispersed in solvent. As for the solvent, those capable dissolving or finely dispersing the binder can be used, and the solvent which can dissolve the binder is preferable. When the solvent which can dissolve the binder, the electrode active material disperse stably by adhering the surface thereof with the binder.

As for the binder, various resin components can be used. For example, polyethylene, polytetrafluoroethylene (PTFE), polyvinylidene fluoride (PVDF), tetrafluoroethylene-hexafluoropropylene copolymer (FEP), polyacrylic acid derivative, polyacrylonitrile derivative and the like can be used. They can be used as alone or may be mixed two kinds or more.

Further, soft polymer exemplified below can be used as binder.

Acrylic type soft polymer, which is homopolymer of acrylic acid or methacrylic acid derivatives or copolymer with monomer copolymerizable therewith, such as polybutylacrylate, polybutylmethacrylate, polyhydroxyethyl methacrylate, polyacrylamide, polyacrylonitrile, butylacrylate/styrene copolymer, butylacrylate/acrylonitrile copolymer, butylacrylate/acrylonitrile/glycidylmethacrylate copolymer and the like; Isobutylene type flexible polymer such as polyisobutylene, isobutylene/isoprene rubber, isobutylene/styrene copolymer and the like;

Diene type soft polymer, such as polybutadiene, polyisoprene, butadiene/styrene random copolymer, isoprene/styrene random copolymer, acrylonitrile/butadiene copolymer, acrylonitrile/butadiene/styrene copolymer, butadiene/styrene block copolymer, styrene/butadiene/styrene block copolymer, isoprene/styrene block copolymer, styrene/isoprene/styrene block copolymer and the like;

Silicon containing soft copolymer such as dimethyl polysiloxane, diphenyl polysiloxane, dihydroxy polysiloxane and the like;

Olefinic soft polymer such as liquid polyethylene, polypropylene, poly-1-butene, ethylene/α-olefin copolymer, propylene/α-olefin copolymer, ethylene/propylene/diene copolymer (EPDM), ethylene/propylene/styrene copolymer and the like;

Vinyl type soft polymer such as polyvinyl alcohol, polyvinyl acetate, polyvinyl stearate, vinyl acetate/styrene copolymer and the like;

Epoxy type soft polymer such as polyethylene oxide, polypropylene oxide, epichlorohydrin rubber and the like;

Fluorine containing soft polymer such as vinylidene fluoride rubber, polytetra-fluoroethylene-propylene rubber and the like;

Other flexible polymer such as natural rubber, polypeptide, protein, polyester type thermoplastic elastomer, vinyl chloride type thermoplastic elastomer, polyamide type thermoplastic elastomer and the like are exemplified. These soft polymers may contain crosslinking structure, and functional groups may be added by modification.

Amount of the binder, when used for the lithium ion secondary battery, is preferably 0.1 to 5 parts by mass, more preferably 0.2 to 4 parts by mass, particularly preferably 0.5 to 3 parts by mass per 100 parts by mass of the electrode active material. Also, when is used for the electric double layer capacitor, it is preferably 0.1 to 20 parts by mass, more preferably 0.5 to 10 parts by mass per 100 parts by mass of the electrode active material. When the amount of binder is too little, there is a risk to disengage the active material from the electrode easily, to the contrary, when it is too much, there are risks to inhibit battery reaction and to increase an internal resistance, because the active material is covered and hidden by the binder.

The binder is prepared as solution or dispersion liquid for producing the electrode. Viscosity at this time is normally in a range of 1 mPa·S to 300,000 mPa·S, preferably 50 mPa·S to 10,000 mPa·S. Said viscosity is a value when it is measured at 25° C. and rotation speed 60 rpm by using B type viscometer.

Normally, the composite material slurry contains solvent to disperse the electrode active material and conductivity improver. As for the solvent, it is preferable to use solvent which is capable to dissolve said binder, because it has excellent dispersibility for the electrode active material and conductivity improver. It is expected that, the binder is adhered on a surface of the electrode active material and the like to thereby stabilizing the dispersion by its volume effect when using the binder dissolved in the solvent condition.

As for the solvent used for the composition material slurry, either water or organic solvent can be used. As for the organic solvent, cycloaliphatic hydrocarbons, such as cyclopentane, cyclohexane and the like; aromatic hydrocarbons such as toluene, xylene and the like, ketones such as ethyl methyl ketone, cyclohexane and the like, esters such as ethylacetate, butylacetate, γ-butyrolactone, ε-caprolactone and the like; acylonitriles such as acetonitrile, propionitrile and the like; ethers such as tetrahydrofuran, ethyleneglycoldiethylether and the like; alcohols such as methanol, ethanol, isopropanol, ethylene glycol, ethyleneglycolmonomethylether and the like; amides such as N-methylpyrrolidone, N,N-dimethyl formamide and the like are exemplified. These solvents can be used suitably selected in view of drying speed and environment by single or mixing two kinds or more.

Agents such as viscosity improver, conductive material, reinforcing material can be added to the composite material slurry by which various functions can be realized. As for the viscosity improver, the organic solvent soluble polymer is used, wherein the organic solvent is that used for the composite material slurry. Specifically, acrylonitrile-butadiene copolymer and the like are used.

Further, trifluoropropylene carbonate, vinylene carbonate, catechol carbonate, 1,6-dioxaspiro[4,4]nonane-2,7-dione, 12-crown-4-ether and the like can be used for the composite material slurry, in order to improve stability and life duration of the battery. Also, these can be used as included in the following mentioned electrolyte solution.

Amount of the organic solvent in the composite material slurry is adjusted so as to be an appropriate viscosity for coating in accordance with kinds of the electrode active material and binder and the like. Specifically, the concentration of solid content mixed by the electrode active material, binder and other additives are adjusted at, preferably 30 to 90 parts by mass, further preferably 40 to 80 parts by mass.

The composite material slurry is obtained by mixing the binder, electrode active material, additive agents to be added in accordance with necessity and other organic solvent with using a blender. As for the blending, although the above mentioned respective components can be supplied into the blender together, such method that the conductive material and viscosity improver are mixed in the organic solvent so as to disperse the conductive material finely, then the binder and the electrode active materials are added and mixed further is preferably, because the dispersibility of the slurry is improved. As for the mixing machine, although a ball mill, sand mill, a pigment dispersing machine, a grinder, an ultrasonic dispersion machine, a homogenizer, a planetary mixer and Hobart mixer can be used, the ball mill is preferred because aggregation of the conductive material and the electrode active material can be prevented.

Granularity of the composite material slurry is preferably 35 μm or less, further preferably 25 μm or less. When the granularity of the slurry is within the above mentioned range, uniform electrode having high dispersibility of the conductive material can be obtained.

Although a collector is not particularly limited if it has electric conductivity and electrochemical durability, in view of having heat resistance, for example, metallic material such as Fe, Cu, Al, Ni, Stainless steel, Ti, Ta, Au, Pt and the like are preferable. In particular, Al is preferable for a positive electrode of nonaqueous electrolyte secondary battery, Cu is particularly preferable for a negative electrode. Although a shape of the collector is not particularly limited, a sheet having about 0.001 to 0.5 mm thickness is preferable. The collector is preferably subjected to surface roughening treatment in advance, for improving binding strength to the composite material. As for a method for roughening surface, mechanical polishing, electropolishing, chemical polishing and the like are exemplified. In the mechanical polishing, a coated abrasives in which abrasive particles are adhered, a grind stone, an emery wheel, a wire brush provided with steel wire and the like are used. Also, in order to improve bonding strength and conductivity of the electrode composite material layer, an intermediate layer may be formed on a surface of the collector.

A method for manufacturing the secondary battery electrode may be any methods which can adhere the electrode composite material layer in the form of laminae on at least one surface, preferably on both surfaces of the collector. For example, said composite material slurry is coated on the collector and is dried, next, heat treated more than one hour at 120° C. or more so as to form the composite material electrode layer. A method for coating the composite material slurry to the collector is not limited. For example, a doctor blade method, a dip method, a reverse roll method, a direct roll method, a gravure method, an extrusion method, a brush application method and the like are exemplified. As for the drying method, for example, drying by warm air, hot air, low humid air, vacuum drying, drying methods by irradiating (far) infrared radiation, electron beam and the like are exemplified.

Next, a porosity of the composite material electrode is preferably lowered by pressure treatment with using mold press, roll press and the like. A preferable range of the porosity is 5% to 15%, further preferably 7% to 13%. When the porosity is too high, charging efficiency and discharge efficiency are deteriorated. When the porosity is too low, problems that it is hard to obtain a high volume capacity, defect due to easily peeling the composite material are occurred. Further, when using curable polymer, it is preferable to perform curing.

A thickness of the electrode composite material layer is in normally 5 to 300 μm for both positive and negative electrodes, preferably 10 to 50 μm.

The secondary battery electrode provided with porous film of the present invention is constituted by forming the porous film on the above mentioned electrode composite material layer. The porous film may be formed on a surface of any positive and negative electrodes and may be formed on both surfaces.

The secondary battery electrode provided with the porous film is produced by coating and drying the above mentioned slurry for porous film including water soluble polymer, particulate polymer, inorganic filler and dispersing medium on the electrode composite material layer of the secondary battery electrode. Also, the porous film can be produced by drying, after immersing the electrode into the slurry. Alternatively, a porous film, which is obtained by coating the slurry on a release film, may be transferred on a predetermined electrode composite material layer.

A method for coating the slurry for porous film on the electrode composite material layer is not particularly limited. For example, the doctor blade method, the dip method, the rivers roll method, the direct roll method, the gravure method, the extrusion method, the brush application method and the like are exemplified. As for the drying method, for example, drying by warm air, hot air, low humid air, vacuum drying, drying methods by irradiating (far) infrared radiation, electron beam and the like are exemplified. The drying temperature is changed according to a kind of used solvent. For example, for removing the solvent completely, in case of using solvent having low volatility such as N-methylpyrrolidone and the like, it is preferable to dry by a blow dryer at high temperature more than 120° C. Contrary to this, in case of using solvent having high volatility, it can be dried at a low temperature lower than 100° C.

Next, adhesion of the electrode composite material layer and the porous film can be improved by pressure treatment with using mold press, roll press and the like. However, in this case, if the pressure treatment is excessively performed, there is a risk to deteriorate the porosity of the porous film, therefore a pressure force and pressing time shall be controlled appropriately.

The secondary battery electrode of the present invention is used as an electrode for a secondary battery such as a lithium ion secondary battery. In particular, it is preferable to be used as an electrode for the lithium ion secondary battery.

The lithium ion secondary battery of the present invention includes a positive electrode, a negative electrode and electrolyte solution, wherein at least one of the positive and negative electrodes is the secondary battery electrode provided with porous film of the present invention.

An example of the secondary battery electrode provided with porous film of the present invention used to the positive electrode and negative electrode will be specified. As for a specific manufacturing method for the lithium ion secondary battery, for example, a method wherein positive electrode provided with a porous film and a negative electrode provided with a porous film are overlapped via a separator, and the resulting laminate is inputted to a battery container by rolling or folding in accordance with a battery shape, filling electrolyte solution to the battery container and sealing is exemplified. Also, it is possible to prevent pressure rising of internal battery, over charge and discharge by inputting over-current protective elements such as expand metal, fuse, PTC elements and the like, a lead plate and the like, in accordance with necessity. A shape of the battery may be any of a coin type, a button type, a sheet type, a cylindrical type, a square type, a flat type and the like.

As for the above mentioned separator, a conventionally known separator composed of polyolefin resin such as polyethylene, polypropylene and the like are used. Note that, because the porous film of the present invention has a separator function too, it is possible to omit using a separator.

As for the electrolyte solution, an organic electrolyte solution wherein supporting electrolyte is solved in the organic solvent is used. As for the supporting electrolyte, lithium salt is used. As for the lithium salt, although there is no limitation particularly, $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF3SO_2)_2NLi$, $(C_2F_5SO_2)NLi$ are exemplified. In particular, $LiPF_6$, $LiClO_4$, $CF_3SO_3Li$ which are easily soluble to solvent and show high dissociation degree are preferred. They may be used as combination of two kinds or more. Because the supporting electrolyte having high dissociation degree is used, the lithium ion conductivity becomes higher, hence the lithium ion conductivity can be controlled by a kind of supporting electrolyte.

Although the organic solvent used for the electrolyte solution is not particularly limited if it is possible to dissolve the supporting electrolyte, carbonates such as dimethyl carbonate (DMC), ethylene carbonate (EC), diethyl carbonate (DEC), propylene carbonate (PC), butylene carbonate (BC), methylethyl carbonate (MEC) and the like; esters such as γ-butyrolactone, methyl formate and the like; ethers such as 1,2-dimethoxyethane, tetrahydrofuran and the like; sulfur-containing compounds such as sulfolane, dimethyl sulfoxide and the like are used preferably. Also, mixture liquids of these solvent may be used. In particular, carbonates are preferable, since they have high conductivity and wide stable potential area. When the viscosity of the used solvent is low, the lithium ion conductivity becomes higher, hence the lithium ion conductivity can be controlled by a kind of the solvent.

Concentration of the supporting electrolyte in the electrolyte solution is normally 1 to 30 mass %, preferably 5 mass % to 20 mass %. Also, in accordance with kinds of the supporting electrolyte, it is used in concentration of 0.5 to 2.5 mol/L normally. When either the concentration of the supporting electrolyte is too low or too high, the ion conductivity tends to be decreased. When the concentration of the used electrolyte is low, a swelling degree of the polymer particle becomes larger, hence the lithium ion conductivity can be controlled by concentration of the electrolyte solution.

EXAMPLE

Below, although the present invention will be explained with showing an example, the present invention is not limited thereto. Note that, part and % in this example are by mass unless otherwise indicated.

In examples and comparative examples, various physical properties are evaluated as follows.

(Evaluation Method)
<1. Water Soluble Polymer>
<1.1 Average Polymerization Degree>

An average polymerization degree of water soluble polymer is a value measured by a viscometric method. The average polymerization degree by the viscometric method is calculated by the following formula on the basis of viscometric law of Staudinger:

$$\{\eta\}=Km \times P \times \alpha$$

In the formula, P is average polymerization degree, Km and α are constants. An intrinsic viscosity is measured by using Ubbelohde viscometer with NaCl solvent of 0.1N, and the average polymerization degree is calculated.

<1.2 Etherification Degree>

An etherification degree (substitution degree) can be evaluated by the following method and formula.

Firstly, 0.5 to 0.7 g of samples are weighed precisely and asking in a porcelain crucible. After cooling, obtained ashes are transferred to a 500 ml beaker and adding 250 ml of water, and further 35 ml of N/10 sulfuric acid is added by a pipette to boil for 30 min. Then, cooling thereof, phenolphthalein indicator is added, an excessive acid is back titrated by N/10 potassium hydrate, and a substitution degree is calculated from the formula as follows.

$$A=(a \times f - b \times f^1)/\text{sample}(g) - \text{alkaline degree}(\text{or} + \text{acid degree})$$

Substitution degree=M×A/(10000−80A)
A: amount (ml) of N/10 sulfuric acid consumed by bonding with alkali metal ion in 1 g of sample
a: amount (ml) of N/10 sulfuric acid
f: N/10 sulfuric acid titer factor
b: titer amount (ml) of N/10 potassium hydrate
$f^1$: N/10 potassium hydrate titer factor
M: weight average molecular weight of sample Note that, the alkaline degree (or acid degree) is evaluated by following method and formula.

About 1 g of sample is dissolved in 200 ml of water, then 5 ml of N/10 sulfuric acid is added thereto. After boiling 10 min, cooled and phenolphthalein indicator is added and titrated by N/10 potassium hydrate. A titration amount at this time is defined as S ml. Simultaneously, blank test is conducted and a titrated amount at this time is defined as B ml so as to calculate the alkaline degree (or acid degree) from following formula. When (B−S)×f value is plus value, the alkaline degree is obtained and when it is minus, the acid degree is obtained.

$$\text{Alkaline degree}(\text{acid degree})=(B-S) \times f/\text{sample}(g)$$

f: N/10 potassium hydrate titer factor

<2. Dispersion Property of Inorganic Filler in Slurry for Porous Film>

<2.1 Aggregability>

D50 volume average particle diameter was evaluated by measuring a dispersion particle diameter of the inorganic filler in the slurry for porous film with using a laser diffraction particle size distribution measuring device. Aggregability is evaluated by following criteria. It is shown that the aggregability is smaller, dispersibility is excellent with the dispersion particle diameter closes to a primary particle.

A: 0.5 μm or less
B: 0.5 μm or more to 1.0 μm or less
C: 1.0 μm or more to 2.0 μm or less
D: 2.0 μm or more to 5.0 μm or less
E: 5.0 μm or more <3. Porous Film>

<3.1 Film Uniformity>

In a width 6 cm×a length 1 m of a porous film electrode, thicknesses were measured at three points to a width direction and every 5 cm of a length direction, these standard variations were calculated.

A: 5% or less
B: 5% or more to 10% or less
C: 10%
D: exceed 10% to 50% or less
E: 50% or more <4. Battery Property>

<4.1 Rate Capability>

By using an obtained coin type battery, it was charged to 0.02V by 0.1 C of constant current at 20° C., a discharge and charge cycle for discharging until 1.5V by 0.1 of constant current and a discharge and charge cycle for discharging until 1.5V by 5.0 C of constant current were performed respectively. The discharge and charge rate efficiency is defined according to calculating the percent of a discharge capacity at 5.0 C to a battery capacity at 0.1 C, and it was evaluated by following criteria. When this value is larger, an internal resistance is small and it is possible to perform high speed discharge and charge.

A: 60% or more
B: 55% or more to 60% or less
C: 50% or more to 55% or less
D: 50% or less For a slurry for a protective film (porous film) forming, following components were used.

<Water Soluble Polymer>

Water soluble polymers having an average polymerization degree and etherification degree shown in Table 1 were used.

TABLE 1

| water soluble polymer | type | average polymerization degree | etherification degree |
|---|---|---|---|
| A | CMC | 1200-1300 | 0.65-0.75 |
| B | CMC | 1000-1200 | 0.65-0.75 |
| C | CMC | 1500-2000 | 0.65-0.75 |
| D | CMC | 2500 or more | 0.65-0.75 |
| E | CMC | 500 or less | 0.65-0.75 |
| F | CMC | 1200-1300 | 0.8-1.0 |
| G | CMC | 1200-1300 | 0.5-0.6 |
| H | CMC | 1200-1300 | 1.0 or more |
| I | CMC | 1200-1300 | 0.5 or less |
| J | pectin | 1000-2000 | — |

<Particulate Polymer>
(Preparation of Particulate Polymer)

70 parts of ion exchange water, 0.2 parts of sodium dodecylbenzenesulfonate, 0.3 parts of potassium persulfate were respectively supplied to a reactor equipped with an agitator, gas phase portion was substituted by nitrogen gas, and temperature was raised to 60° C. On the other hand, monomer mixture was obtained by blending 50 parts of ion exchange water, 0.5 parts of sodium dodecylbenzenesulfonate, and as for polymerizable monomers, 80 parts of ethylacrylate, 15 parts of acrylonitrile, 3 parts of methacrylic acid, 2 parts of glycidylmethacrylate. Polymerization was made by continuously adding the monomer mixture to said reactor for 4 hrs. During addition, reaction was performed at 60° C. After finishing the addition, further stirring for 3 hrs at 70° C. was continued, and then reaction was terminated. A polymerization conversion rate was 99%. After cooling the obtained polymerization reaction liquid to 25° C., and was adjusted to pH of 7 by adding aqueous ammonia, then non reacted monomers ware removed by inducing steam and 40% water dispersion of particulate polymer was obtained. The obtained particulate polymer comprises epoxy group as crosslinking group, glass transition temperature was −35° C. and an average particle diameter was 150 nm.

(Manufacturing Secondary Battery Electrode)
<Producing Negative Electrode>

98 parts of graphite having 20 μm particle diameter and 4.2 m²/g specific surface area as a negative electrode active material, 1 part, in terms of solid content, of SBR (glass transition temperature: −10° C.) as a binder are blended, further 1 part of carboxymethyl cellulose (CMC) is added and blended by a planetary mixer so that an electrode composition slurry for negative electrode was prepared. The negative electrode composition was coated on one surface of a copper foil having 0.1 mm thickness, dried after 3 hrs at 120° C., was roll pressed to thereby obtained a negative electrode having 100 μm thickness.

(Manufacturing Slurry for Porous Film)

Inorganic filler (α-Al₂O₃, 0.5 μm average particle diameter), water soluble polymer and particulate polymer were blended in water so that their respective solid content weight ratio becomes 90:4:6 for preparing slurry for porous film. Content amount of raw materials (sum of solid contents) is set to be 40 mass % in all cases. Note that, for the water soluble polymer, 1 wt % concentration pre-dissolved solution in water was used.

With respect to the slurry for porous film prepared in the above mentioned, aggregability is evaluated. Results are shown in Table 2.

(Manufacturing Second Battery Electrode Provided with Porous Film)

The slurry for porous film is coated to a surface of negative electrode so that a negative electrode composite material layer is covered completely and a thickness after drying becomes 10 μm, and dried for 20 min at 110° C. to form the porous film, thereby a secondary battery electrode provided with porous film was obtained. A film uniformity was evaluated. Results are shown in Table 2.

(Producing Battery)

Next, the obtained electrode was cut to be a circular shape having 13 mm diameter, the obtained negative electrode was cut to be a circular shape having 14 mmφ. A separator composed of a circular shape polypropylene having 18 mm diameter and 25 μm thickness, a lithium metallic film having 0.5 mm thickness and 16 mmø diameter are sequentially laminated on a surface wherein the negative electrode composite material is formed, and was inserted into a coin type external container made of stainless steel provided with a packing made of polypropylene. Electrolyte solution (EC/DEC=½, 1M of LiPF₆) was injected into the container without residual air, fixed by a cap made of stainless steel having 0.2 mm thickness via the polypropylene packing to seal a battery case, thereby a lithium ion secondary battery having 20 mm diameter and about 3.2 mm thickness was produced (coin cell CR2032). Results for measuring rate capability of the obtained battery are shown in Table 2.

TABLE 2

|  | water soluble polymer | aggregability of slurry for porous film | uniformity of porous film | battery characteristic rate capability |
|---|---|---|---|---|
| Example 1 | A | A | A | A |
| Example 2 | B | B | A | A |
| Example 3 | C | C | C | B |
| Example 4 | F | A | B | B |
| Example 5 | G | B | A | A |
| Comparative Example 1 | D | D | D | D |
| Comparative Example 2 | E | C | E | D |
| Comparative Example 3 | H | C | C | B |
| Comparative Example 4 | I | D | A | C |
| Comparative Example 5 | J | B | C | B |

As mentioned above, fluidity of the slurry and dispersibility of the inorganic filler are improved by using the water soluble polymer having specific average polymerization degree and particulate polymer, as a result, a porous film having an excellent rate capability and high uniformity can be obtained.

The invention claimed is:

1. A porous film comprising;
water soluble polymer having an average polymerization degree of 500 to 2500,
an inorganic filler and
water insoluble particulate polymer, wherein
said water soluble polymer is selected from the group consisting of cellulose base semisynthetic polymers, sodium salts of cellulose base semisynthetic polymers, and ammonium salts of cellulose base semisynthetic polymers,
said water soluble polymer has a degree of etherification of 0.5 to 1.0, and
said water insoluble particulate polymer contains at least one cross-linking group selected from the group consisting of an epoxy group, a hydroxyl group, an N-methylol amide group, and an oxazoline group.

2. The porous film as set forth in claim 1, wherein
a content ratio of the water soluble polymer in said porous film is 0.1 to 5 parts by mass per 100 parts by mass of said inorganic filler, a content ratio of water-insoluble particulate polymer is 0.1 to 15 parts by mass per 100 parts by mass of the inorganic filler.

3. A secondary battery electrode comprising;
an electrode composite material layer including a binder and an electrode active material,
a collector to which the electrode composite material layer is adhered, and
the porous film as set forth in claim 1 is provided on a surface of the electrode composite material layer.

4. A method for manufacturing secondary battery electrode as set forth in claim 3 comprising;
coating and drying a slurry for porous film including water soluble polymer having 500 to 2500 average polymerization degree, an inorganic filler, water-insoluble particulate polymer and dispersion medium on an electrode composite material layer including a binder and an electrode active material, wherein
said water soluble polymer is selected from the group consisting of cellulose base semisynthetic polymers, sodium salts of cellulose base semisynthetic polymers, and ammonium salts of cellulose base semisynthetic polymers,
said water soluble polymer has a degree of etherification of 0.5 to 1.0, and
said water-insoluble particulate polymer contains at least one cross-linking group selected from the group consisting of an epoxy group, a hydroxyl group, an N-methylol amide group, and an oxazoline group.

5. A lithium ion secondary battery comprising a positive electrode, a negative electrode and electrolyte solution wherein
at least one of the positive electrode and the negative electrode is the electrode as set forth in claim 3.

6. The porous film as set forth in claim 1, wherein an average particle diameter of said inorganic filler is 0.1 to 5 μm.

7. The porous film as set forth in claim 1, wherein an average particle diameter of the water-insoluble particulate polymer is 0.01 to 0.5 μm.

8. The porous film as set forth in claim 1, wherein the water-insoluble particulate polymer is an acrylic flexible polymer.

9. A slurry for porous film comprising:
water soluble polymer having an average polymerization degree of 500 to 2500,
an inorganic filler and
water insoluble particulate polymer, and
dispersion medium, wherein
said water soluble polymer is selected from the group consisting of cellulose base semisynthetic polymers, sodium salts of cellulose base semisynthetic polymers, and ammonium salts of cellulose base semisynthetic polymers,
said water soluble polymer has a degree of etherification of 0.5 to 1.0, and
said water insoluble particulate polymer contains at least one cross-linking group selected from the group consisting of an epoxy group, a hydroxyl group, an N-methylol amide group, and an oxazoline group.

10. The slurry for porous film as set forth in claim 9, wherein a content ratio of the water soluble polymer in said porous film is 0.1 to 5 parts by mass per 100 parts by mass of said inorganic filler, a content ratio of water-insoluble particulate polymer is 0.1 to 15 parts by mass per 100 parts by mass of the inorganic filler.

11. The slurry for porous film as set forth in claim 9, wherein an average particle diameter of said inorganic filler is 0.1 to 5 μm.

12. The slurry for porous film as set forth in claim 9, wherein an average particle diameter of the water-insoluble particulate polymer is 0.01 to 0.5 μm.

13. The slurry for porous film as set forth in claim 9, wherein the water-insoluble particulate polymer is an acrylic flexible polymer.

14. The porous film as set forth in claim 1, wherein the water soluble polymer has an average polymerization degree of 500 to 1200.

15. A porous film comprising;
water soluble polymer having an average polymerization degree of 500 to 2500,
an inorganic filler and
water insoluble particulate polymer, wherein
said water soluble polymer is selected from the group consisting of cellulose base semisynthetic polymers, sodium salts of cellulose base semisynthetic polymers, and ammonium salts of cellulose base semisynthetic polymers,
said water soluble polymer has a degree of etherification of 0.5 to 1.0, and
said water insoluble particulate polymer contains at least one cross-linking group selected from the group consisting of an epoxy group, a hydroxyl group, an N-methylol amide group, and an oxazoline group;
wherein an average particle diameter of said inorganic filler is 0.1 to 5 μm;
wherein an average particle diameter of the water-insoluble particulate polymer is 0.01 to 0.5 μm; and
wherein the water-insoluble particulate polymer is an acrylic flexible polymer.

16. The porous film as set forth in claim 1, wherein the hydroxyl group as the crosslinking group is not an —OH portion of a carboxyl group.

17. The method for manufacturing secondary battery electrode as set forth in claim 4, wherein the hydroxyl group as the crosslinking group is not an —OH portion of a carboxyl group.

18. The slurry for porous film as set forth in claim 9, wherein the hydroxyl group as the crosslinking group is not an —OH portion of a carboxyl group.

19. The porous film as set forth in claim 15, wherein the hydroxyl group as the crosslinking group is not an —OH portion of a carboxyl group.

* * * * *